United States Patent
Hampton et al.

(10) Patent No.: US 9,666,349 B2
(45) Date of Patent: May 30, 2017

(54) MAGNETICALLY ACTUATED SHUT-OFF VALVE

(71) Applicants: Keith Hampton, Ann Arbor, MI (US); Brian M. Graichen, Leonard, MI (US)

(72) Inventors: Keith Hampton, Ann Arbor, MI (US); Brian M. Graichen, Leonard, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 0 days.

(21) Appl. No.: 14/565,814

(22) Filed: Dec. 10, 2014

(65) Prior Publication Data

US 2015/0162155 A1   Jun. 11, 2015

Related U.S. Application Data

(60) Provisional application No. 61/914,658, filed on Dec. 11, 2013.

(51) Int. Cl.
| | |
|---|---|
| H01F 5/00 | (2006.01) |
| H01F 7/16 | (2006.01) |
| F16K 31/06 | (2006.01) |
| H01F 7/08 | (2006.01) |
| F02D 11/10 | (2006.01) |

(52) U.S. Cl.
CPC ....... *H01F 7/1646* (2013.01); *F16K 31/0668* (2013.01); *F16K 31/0675* (2013.01); *F02D 11/10* (2013.01); *H01F 2007/086* (2013.01)

(58) Field of Classification Search
CPC ...... H01H 50/18; H01H 50/44; H01H 50/641; H01H 27/24; F16K 31/06–31/105; F16K 15/18; F16K 39/04
USPC ......................................................... 335/266
See application file for complete search history.

(56) References Cited

U.S. PATENT DOCUMENTS

| | | |
|---|---|---|
| 2,740,962 A | 6/1956 | Kreichman et al. |
| 2,816,730 A | 12/1957 | Rabas |
| 2,835,468 A | 5/1958 | Sparks |
| (Continued) | | |

FOREIGN PATENT DOCUMENTS

| | | |
|---|---|---|
| CA | 1063454 | 10/1975 |
| CN | 2714933 | 10/1978 |
| (Continued) | | |

OTHER PUBLICATIONS

US, Non-Final Office Action, U.S. Appl. No. 14/277,815, (Jan. 15, 2016).

(Continued)

*Primary Examiner* — Shawki S Ismail
*Assistant Examiner* — Lisa Homza
(74) *Attorney, Agent, or Firm* — Thompson Hine LLP

(57) ABSTRACT

A magnetic actuator assembly is disclosed, and includes a core, wiring, and a gate assembly. The core is constructed of a magnetic material, and includes a first end and a second end. The wiring is wound around a portion of the core. A predetermined amount of electric current is applied to the wiring to induce a magnetic field within the core. The gate assembly is positioned between the first end and a second end of the core. The gate assembly comprises a first gate member traveling between the first end and a second end of the core based on a threshold force being applied to the gate assembly. The threshold force is created by the magnetic field.

18 Claims, 14 Drawing Sheets

(56) References Cited

U.S. PATENT DOCUMENTS

| | | |
|---|---|---|
| 2,913,220 A | 11/1959 | Cover |
| 2,953,346 A | 9/1960 | Liecke et al. |
| 3,069,131 A | 12/1962 | Grove |
| 3,113,757 A | 12/1963 | Nixon |
| 3,203,447 A * | 8/1965 | Bremner ............ F16K 31/0627 137/595 |
| 3,379,214 A * | 4/1968 | Weinberg ............ F16K 31/082 137/625.5 |
| 3,478,771 A | 11/1969 | Johnson |
| 3,534,307 A * | 10/1970 | Bratkowski ............ H01H 51/01 335/170 |
| 3,635,601 A | 1/1972 | Larson et al. |
| 3,666,231 A | 5/1972 | Parodi |
| 3,706,321 A | 12/1972 | Vicari |
| 3,768,774 A | 10/1973 | Baugh |
| 3,871,616 A | 3/1975 | Taylor |
| 4,010,928 A | 3/1977 | Smith |
| 4,013,090 A | 3/1977 | Taylor |
| 4,056,255 A | 11/1977 | Lace |
| 4,146,209 A | 3/1979 | Leva |
| 4,157,169 A | 6/1979 | Norman |
| 4,179,099 A | 12/1979 | Pierce, Jr. |
| 4,210,308 A | 7/1980 | Sims |
| 4,253,487 A | 3/1981 | Worley et al. |
| 4,321,652 A * | 3/1982 | Baker ............ H01F 3/10 335/229 |
| 4,340,336 A | 7/1982 | Clary |
| 4,341,369 A | 7/1982 | Meyer |
| 4,385,280 A * | 5/1983 | Reisem ............ H01H 50/16 335/230 |
| 4,446,887 A | 5/1984 | Redmon et al. |
| 4,535,967 A | 8/1985 | Babbitt et al. |
| 4,568,058 A | 2/1986 | Shelton |
| 4,585,207 A | 4/1986 | Shelton |
| 4,638,193 A | 1/1987 | Jones |
| 4,779,582 A * | 10/1988 | Lequesne ............ F01L 9/04 123/90.11 |
| 4,809,742 A | 3/1989 | Grau |
| 4,934,652 A | 6/1990 | Golden |
| 5,000,215 A | 3/1991 | Phillips |
| 5,020,774 A | 6/1991 | Christianson |
| 5,059,813 A | 10/1991 | Shiroymama |
| 5,172,658 A * | 12/1992 | Hampton ............ F16D 3/10 123/90.17 |
| 5,195,722 A | 3/1993 | Bedner |
| 5,234,088 A * | 8/1993 | Hampton ............ F01L 1/34409 123/90.15 |
| 5,235,941 A * | 8/1993 | Hampton ............ F16D 3/10 123/90.17 |
| 5,377,955 A | 1/1995 | Baker |
| 5,394,131 A * | 2/1995 | Lungu ............ F16D 67/06 251/129.01 |
| 5,490,031 A | 2/1996 | Braun et al. |
| 5,627,504 A | 5/1997 | Kleinhappl |
| 5,781,399 A | 7/1998 | Lanigan et al. |
| 5,820,104 A | 10/1998 | Koyano |
| 5,909,525 A | 6/1999 | Miller et al. |
| 5,982,605 A | 11/1999 | Massey et al. |
| 6,057,750 A * | 5/2000 | Sheng ............ H01F 7/1615 335/229 |
| 6,158,718 A | 12/2000 | Lang et al. |
| 6,164,322 A | 12/2000 | Najmolhoda |
| 6,199,587 B1 | 3/2001 | Shlomi et al. |
| 6,337,612 B1 | 1/2002 | Kim et al. |
| 6,357,721 B1 | 3/2002 | Maurer |
| 6,425,410 B1 | 7/2002 | Taylor |
| 6,442,955 B1 | 9/2002 | Oakner et al. |
| 6,563,238 B1 * | 5/2003 | Lee ............ G01P 15/0888 310/15 |
| 6,578,818 B1 | 6/2003 | Krimmer |
| 7,017,886 B1 | 3/2006 | Ngene-Igwe |
| 7,108,008 B2 | 9/2006 | Moreno |
| 7,126,449 B2 * | 10/2006 | Nickel ............ F16K 31/0655 251/129.15 |
| 7,523,916 B2 | 4/2009 | Fenton |
| 7,849,674 B2 | 12/2010 | Masuda et al. |
| 8,235,011 B2 | 8/2012 | Lengfeld et al. |
| 8,561,392 B2 | 10/2013 | Ogunleye et al. |
| 2002/0066877 A1 | 6/2002 | Nakagawa |
| 2004/0113731 A1 | 6/2004 | Moyer et al. |
| 2006/0016477 A1 | 1/2006 | Zaparackas |
| 2006/0219302 A1 | 10/2006 | Knop |
| 2007/0053133 A1 | 3/2007 | Evans |
| 2007/0227478 A1 | 10/2007 | Fitzgerald |
| 2008/0006791 A1 | 1/2008 | Reinicke |
| 2008/0099090 A1 | 5/2008 | Cook |
| 2008/0099710 A1 | 5/2008 | Jennings |
| 2009/0020719 A1 | 1/2009 | Ishigaki |
| 2009/0094009 A1 | 4/2009 | Muller |
| 2011/0132373 A1 | 6/2011 | Pursifull et al. |
| 2011/0196541 A1 | 8/2011 | Bauman et al. |
| 2012/0161049 A1 | 6/2012 | Alvarez |
| 2012/0256111 A1 | 10/2012 | Hoang et al. |
| 2012/0256113 A1 | 10/2012 | Comeaux |
| 2012/0286182 A1 | 11/2012 | Hoang et al. |
| 2012/0313023 A1 | 12/2012 | Brock |
| 2013/0061949 A1 | 3/2013 | Minezawa et al. |
| 2013/0062548 A1 | 3/2013 | Yokomi |
| 2013/0340732 A1 | 12/2013 | Pursifull et al. |
| 2014/0353534 A1 * | 12/2014 | Graichen ............ F16K 31/1221 251/213 |
| 2015/0060709 A1 * | 3/2015 | Fletcher ............ F16K 3/16 251/62 |
| 2015/0090355 A1 * | 4/2015 | Fletcher ............ F16K 31/0668 137/630.12 |
| 2015/0128573 A1 | 5/2015 | Fletcher et al. |
| 2015/0159677 A1 * | 6/2015 | Hampton ............ F04F 5/20 417/182 |
| 2015/0162155 A1 | 6/2015 | Hampton et al. |
| 2015/0354600 A1 * | 12/2015 | Fletcher ............ F04F 5/54 417/179 |
| 2016/0153472 A1 * | 6/2016 | Fletcher ............ F02M 25/0854 123/519 |

FOREIGN PATENT DOCUMENTS

| | | |
|---|---|---|
| CN | 2085459 | 9/1991 |
| CN | 1205065 | 1/1999 |
| CN | 2480633 | 3/2002 |
| CN | 2534389 | 2/2003 |
| CN | 101036012 | 9/2007 |
| CN | 101772624 | 7/2010 |
| CN | 201679974 | 12/2010 |
| CN | 101963240 | 2/2011 |
| CN | 201866285 | 6/2011 |
| CN | 102996837 | 3/2013 |
| DE | 3209199 | 9/1983 |
| DE | 19727602 | 10/1998 |
| EP | 1333207 | 6/2003 |
| GB | 1411303 | 10/1975 |
| JP | S59-214280 | 12/1984 |
| JP | S61-180423 | 8/1986 |
| JP | 3665674 | 6/2005 |
| WO | 95/29356 | 11/1995 |
| WO | 01/14775 | 3/2001 |
| WO | 2009/045140 | 4/2009 |
| WO | 2012/100287 | 8/2012 |
| WO | 2013/049643 | 4/2013 |

OTHER PUBLICATIONS

CN, Search Report; Patent Application No. 201480001143.2 (Jan. 22, 2016).
CN, Office Action; Patent Application No. 201480001143.2 (Feb. 3, 2016).
CN, Search Report; Patent Application No. 2014800021010 (Mar. 22, 2016).
CN, First Office Action; Patent Application No. 2014800021010 (Mar. 30, 2016).
CN, English Translation of First Office Action; Patent Application No. 2014800011432 (Feb. 3, 2016).

(56) References Cited

OTHER PUBLICATIONS

PCT, International Search Report and Written Opinion, International Application No. US/2014/069461 (Mar. 4, 2015).
PCT, International Search Report and Written Opinion, International Application No. US/2014/069528 (Mar. 10, 2015).
PCT, International Search Report and Written Opinion, International Application No. US/2014/069796 (Mar. 12, 2015).
PCT, International Search Report and Written Opinion, International Application No. US/2014/038018 (Nov. 26, 2014).
PCT, International Search Report and Written Opinion, International Application No. US/2014/053435 (Dec. 18, 2014).
PCT, International Search Report and Written Opinion, International Application No. US/2014/065252 (Feb. 19, 2015).
US, Non-Final Office Action; U.S. Appl. No. 14/473,151; (May 19, 2016).
US, Non-Final Office Action; U.S. Appl. No. 14/567,450; (May 19, 2016).
US, Notice of Allowance; U.S. Appl. No. 14/539,656; (Dec. 15, 2015).
US, Notice of Allowance; U.S. Appl. No. 14/567,450; (Oct. 11, 2016).
US, Advisory Action; U.S. Appl. No. 14/277,815;(Oct. 20, 2016).
CN, Search Report with English translation; Patent Application No. 201480002102.5; (Jul. 26, 2016).
CN, Office Action with English translation; Patent Application No. 201480002102.5; (Aug. 3, 2016).
US, Final Office Action; U.S. Appl. No. 14/277,815; (Aug. 5, 2016).
CN, Office Action and Search Report with English translation; Patent Application No. 201410391935.7; (Sep. 2, 2016).
CN, Office Action and Search Report with English translation; Patent Application No. 201480002180.5; (Sep. 2, 2016).
PCT, International Search Report and Written Opinion, PCT/US2016/045565, 15 pages, Dec. 8, 2016.
US, Notice of Allowance, U.S. Appl. No. 14/818,851, 11 pages, Nov. 3, 2016.

\* cited by examiner

MAGNETICALLY ACTUATED SHUT-OFF VALVE

RELATED APPLICATIONS

This application claims the benefit of U.S. Provisional Application No. 61/914,658, filed on Dec. 11, 2013.

TECHNICAL FIELD

This application relates to shut-off valves having on and off positions, and more particularly to magnetically actuated solenoid valves for use in an internal combustion engine.

BACKGROUND

In current actuators the on/off operation in a pneumatic device is achieved with an electric solenoid valve. Vacuum force is applied to the actuator only when the solenoid is "on" and only when the vacuum force is high enough to move the actuator the full length of its travel. Alternately, without a solenoid controlling the actuator's exposure to vacuum, an actuator exposed to vacuum force under all conditions will "float" between the on position and the off position. Floating is undesirable, inefficient, and provides poor control of the device attached to the actuator. There is a need in the art to make energy efficient actuators that are effective at controlling the electric solenoid whenever the device is supposed to be on.

SUMMARY

Herein actuators are described for the control of valves having on-off functionality. The actuators will stay in a normally seated position, which may correspond to either an open position or a closed position for a gate assembly, until a threshold force is applied. Once the threshold force is reached, the gate assembly will move the full length of its travel to a second position. The gate assembly will remain in the second position until the threshold force is applied again, at which point the gate assembly moves back to its starting position by again moving the full length of its travel.

In one embodiment, a magnetic actuator assembly is disclosed, and includes a core, wiring, and a gate assembly. The core is constructed of a magnetic material, and includes a first end and a second end. The wiring is wound around a portion of the core. A predetermined amount of electric current is applied to the wiring to induce a magnetic field within the core. The gate assembly is positioned between the first end and a second end of the core. The gate assembly comprises a first gate member traveling between the first end and a second end of the core based on a threshold force being applied to the gate assembly. The threshold force is created by the magnetic field.

In another embodiment, a housing is disclosed and includes a first section, a second section, and a magnetic actuator assembly. The first section has a first conduit portion. The second section has a second conduit portion that is in fluid communication with the first conduit portion. The first section and the second section are joined together to define the housing. The magnetic actuator assembly is located within the housing. The magnetic actuator assembly includes a core, a bobbin, wiring, and a gate assembly. The core is constructed of a magnetic material, the core including a first end and a second end. The bobbin surrounds a portion of the core. The wiring is wound around the bobbin. A predetermined amount of electric current is applied to the wiring to induce a magnetic field within the core. The gate assembly is positioned between the first end and the second end of the core, and defines a passageway that blocks a flow of fluid flowing from the first conduit portion if the gate assembly is in a closed position. The gate assembly comprises a first gate member and a second gate member. Both the first gate member and the second gate member travel together between the first end and the second end of the core based on a threshold force being applied to the gate assembly. The threshold force is created by the magnetic field.

BRIEF DESCRIPTION OF THE DRAWINGS

FIG. 9A is an illustration of the magnetic actuator assembly in a closed position and FIG. 9B is an illustration of the magnetic actuator assembly in an open position.

FIG. 10A is an illustration of the magnetic shut-off valve in the closed position and FIG. 10B is an illustration of the shut-off valve in the open position.

DETAILED DESCRIPTION

Figure 1:
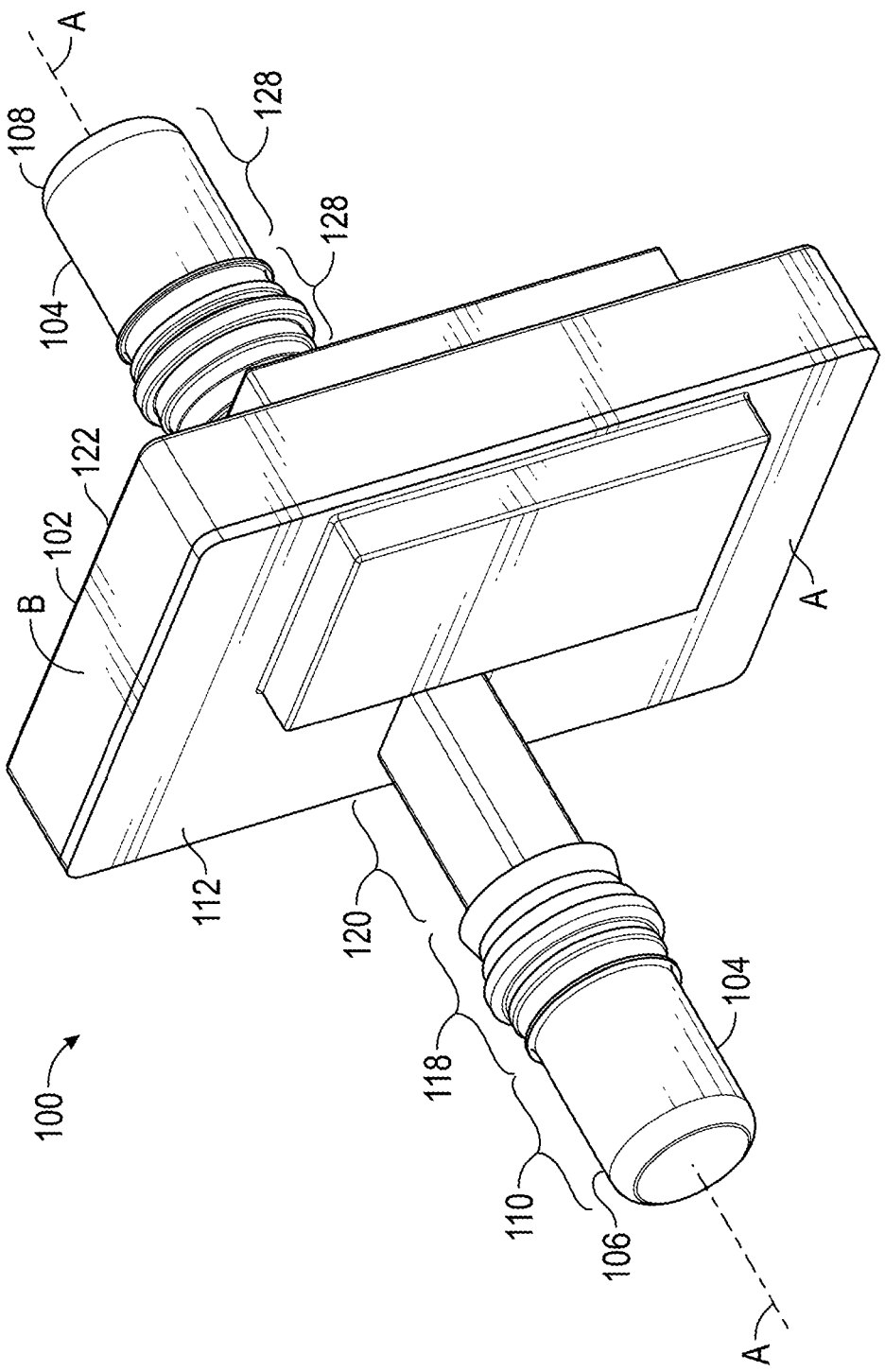
FIG. 1 is a front perspective view of one embodiment of a housing for a shut-off valve.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
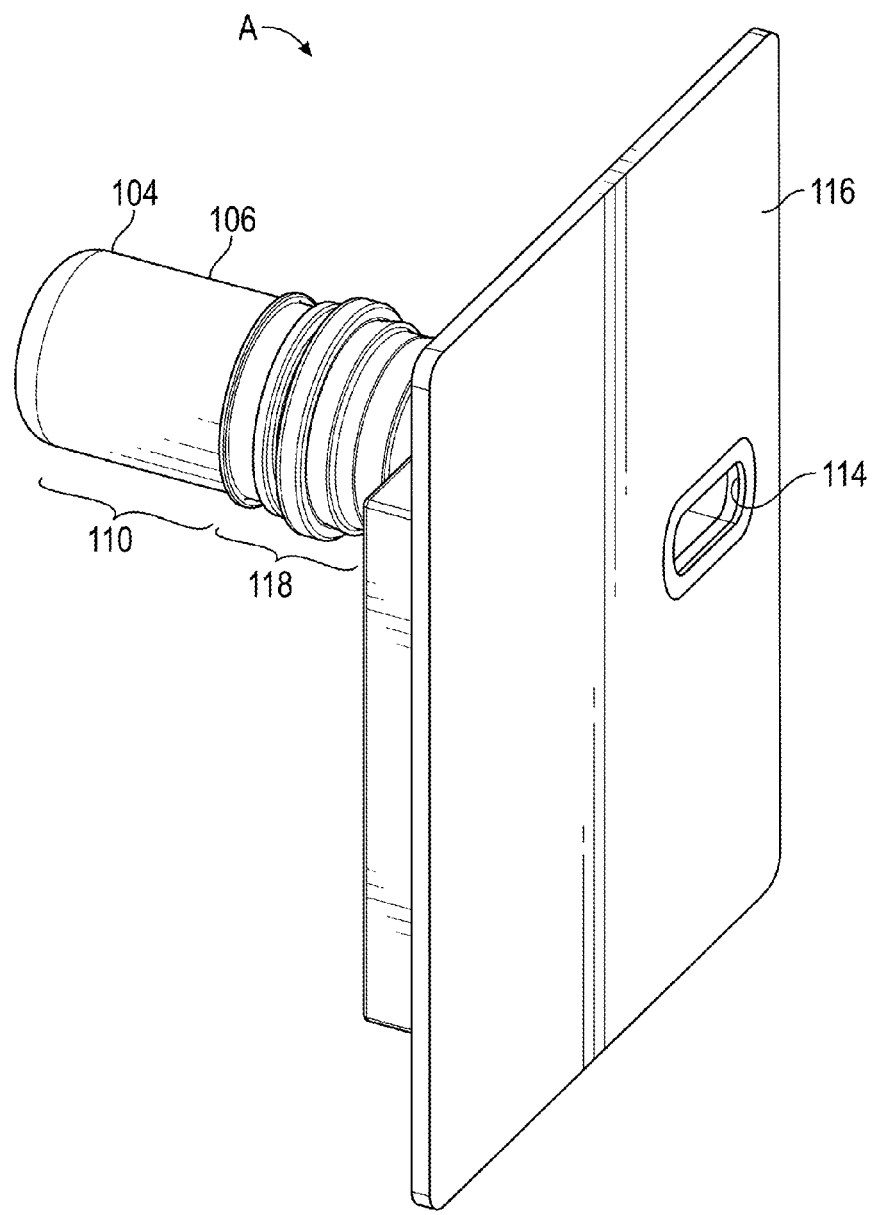
FIG. 2 is a front perspective view of a first section of the housing shown in FIG. 1.
Figure 3:
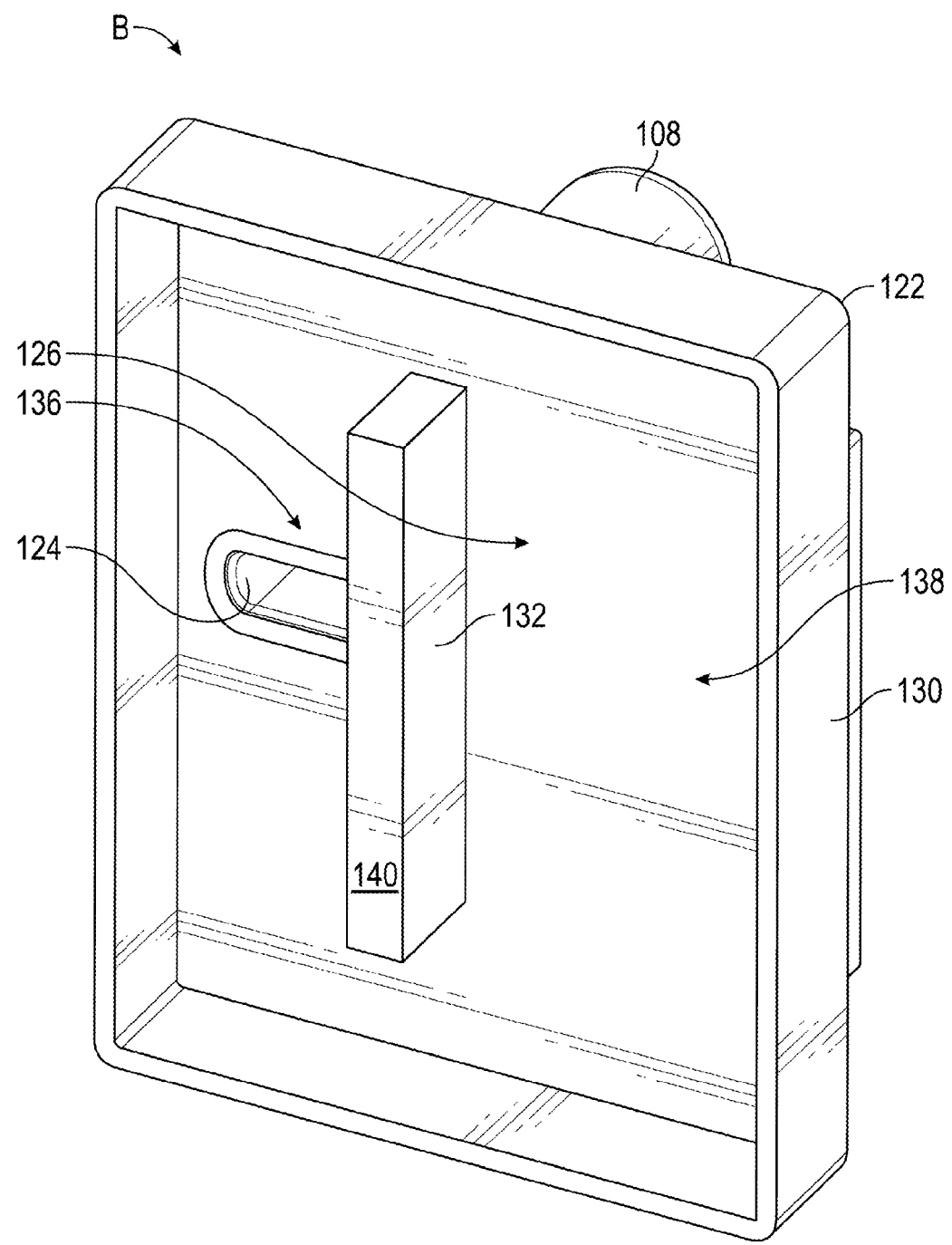
FIG. 3 is a front perspective view of a second section of the housing shown in FIG. 1.

FIGS. 1-3 illustrate an embodiment of a device 100 for use in an internal combustion engine. The device 100 includes a housing 102 and a conduit 104. The housing 102 includes a first section A and a second section B. In one exemplary embodiment, the first section A and the second section B of the housing 102 may be plastic injection molded components that are joined to one another using a plastic welding process. A magnetic actuator assembly 142 (FIG. 4) may be located within the housing 102, and is described in greater detail below. The magnetic actuator assembly 142 may be used to actuate a gate assembly 146 (FIG. 4) between a closed position (seen in FIG. 9A) and an open position (FIG. 9B), which is described in greater detail below.

Referring to FIG. 1, the conduit 104 may be used to transport fluid, and may include a first conduit portion 106 and a second conduit portion 108. The first conduit portion 106 is part of the first section A of the housing 102, and the second conduit portion 108 is part of the second section B of the housing 102. The first conduit portion 106 may project outwardly from an outer surface 112 of the first section A of the housing 102.

Referring to FIGS. 1-2, an opening 114 is located along an inner surface 116 of the first section A of the housing 102. The opening 114 is in fluid communication with the first conduit portion 106. In the embodiment as shown in FIGS. 1-2, the first conduit portion 106 may include a first section 110, sealing features 118, and a second section 120. In one exemplary embodiment, the first section 110 of the first conduit portion 106 may include a generally circular cross-section, and the second section 120 of the first conduit portion 106 may include a generally rectangular cross-section. Although a circular cross-section and a rectangular cross-section are discussed, it is to be understood that the first conduit portion 106 may include other cross-sectional areas as well. The first conduit portion 106 may be sealingly engaged with a hose or a tube (not illustrated), where a generally fluid-tight seal may be created between the sealing features 118 of the first conduit portion 106 and the tube.

Referring to FIGS. 1 and 3, the second conduit portion 108 may also project outwardly from an outer surface 122 of the second section B of the housing 102. Referring to FIGS. 1 and 3, an opening 124 is located along an interior surface 126 of the first section A of the housing 102. The opening 124 is in fluid communication with the second conduit portion 108. In the embodiment as shown in FIGS. 1 and 3, the second conduit portion 108 may include a first section 128, sealing features 129, and a second section (not visible in FIGS. 1 and 3). The first section 128 of the second conduit portion 108 may include a generally circular cross-section, and the second section of the second conduit portion 108 (not visible) may include a generally rectangular cross-section. Although a circular cross-section and a rectangular cross-section are discussed, it is to be understood that the second conduit portion 108 may include other cross-sectional areas as well. The second conduit portion 108 may be sealingly engaged with a hose or a tube (not illustrated), where a generally fluid-tight seal may be created between the sealing features 129 of the second conduit portion 108 and the tube.

Referring to FIGS. 1-3, the opening 114 located within the first section A of the housing 102 and the opening 124 located within the second section B of the housing 102 may both be located along an axis A-A of the conduit 104, and are generally aligned with one another. The first conduit portion 106, the second conduit portion 108, and the housing 102 are in fluid communication with one another. Thus, fluid may flow from the first conduit portion 106 and into the second conduit portion 108 if the gate assembly 146 is in the open position (shown in FIG. 9B).

Referring to FIG. 3, the second section B of the housing 102 may include an outer lip 130. The outer lip 130 may extend around an outer perimeter of the second section B of the housing 102. The second section B of the housing 102 may also be a raised section 132 located along the interior surface 126. The raised section 132 may project outwardly from the interior surface 126 of the first section B of the housing 102. Referring to FIGS. 1-3, during assembly of the housing 102 the outer lip 130 of the second section B of the housing 102 may abut against the inner surface 116 of the first section A of the housing 102. The second section B of the housing may then be plastic welded to the first section A, thereby joining the first section A and the second section B together.

Referring to both FIGS. 2 and 3, when the first section A and the second section B are joined together, the raised section 132 of the second section B may define a pocket 136 and a cavity 138 within the second section B of the housing 102. A top surface 140 of the raised section 132 of the second section B of the housing 102 may abut against the inner surface 116 of the first section A of the housing 102 when the first section A and the second section B of the housing 102 are joined together.

Figure 4:
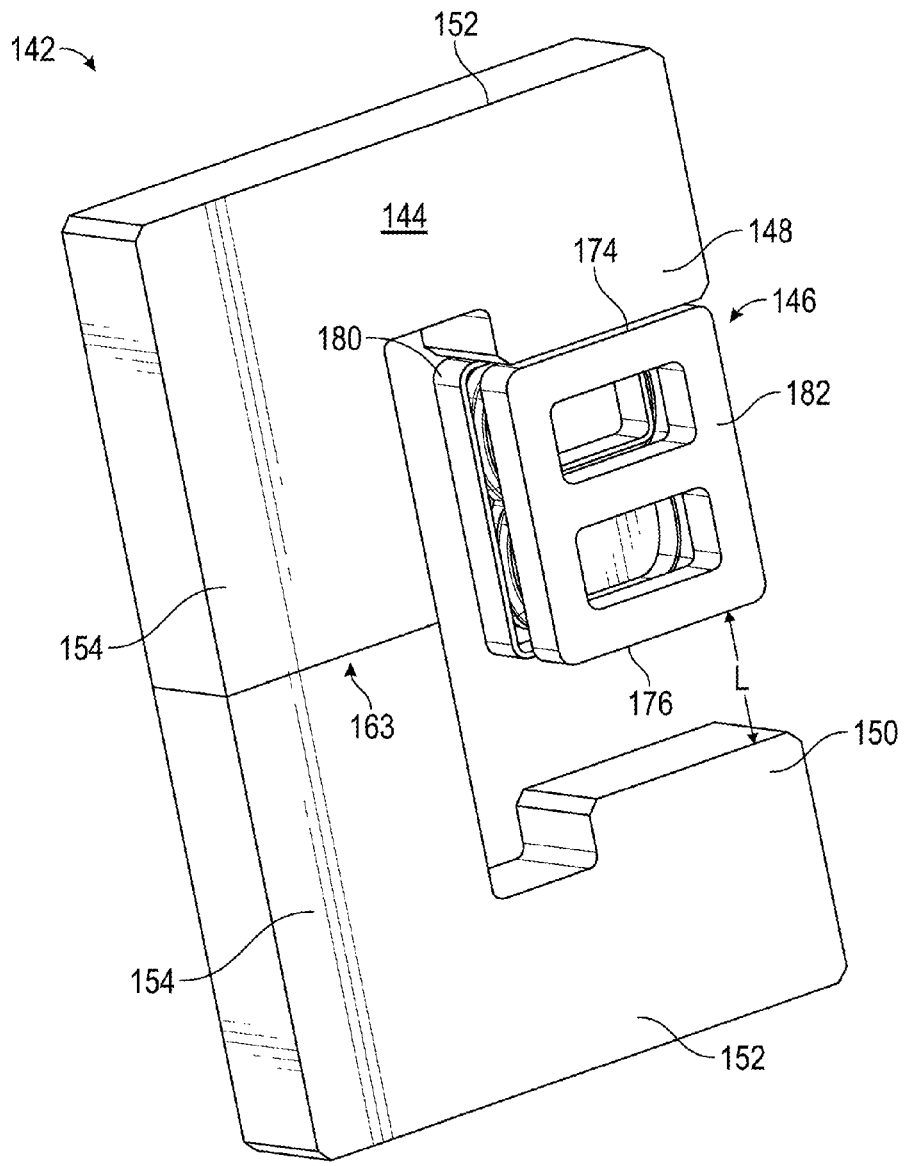
FIG. 4 is a front perspective view of a magnetic actuator assembly that is located within the housing shown in FIG. 1.

FIG. 4 is an illustration of the magnetic actuator assembly 142 and the gate assembly 146 that are located within the housing 102 (FIG. 1). The magnetic actuator assembly 142 includes a core 144. The core 144 may be constructed of a soft magnetic material. In the exemplary embodiment as shown in FIG. 4, the core 144 may include a generally C-shaped profile having an upper end 148 and a lower end 150. The gate assembly 146 may be positioned between the upper end 148 and the lower end 150 of the core 144. Referring to FIGS. 2-4, the core 144 may be housed within the cavity 138 defined by the second section B of the housing 102. The gate assembly 146 may be housed within the pocket 136 defined by the second section B of the housing 102.

Continuing to refer to FIGS. 2-4, when the first section A and the second section B of the housing 102 are joined together, the top surface 140 of the raised section 132 of the second section B of the housing 102 abuts against the inner surface 116 of the first section A of the housing 102. Moreover, both the upper end 148 and the lower end 150 of the core 144 may be aligned with or extend into the pocket 136 defined by the second section B of the housing 102. Thus, the pocket 136 may generally be sealed off from the cavity 138 of the second section B of the housing 102.

Referring to FIG. 4, in one embodiment the core 144 may be comprised of two symmetrical half sections 152. The half sections 152 may be positioned together at their respective ends 154 to form the generally C-shaped core 144. In the exemplary embodiment as shown, the half sections 152 may include a generally J-shaped profile. Each of the half sections 152 may be constructed of a series of sheets (not visible in FIG. 4) that are stacked one on top of the other, and joined together. The sheets may be constructed of any type of material that may act as a conduit for magnetic flux to travel. For example, in one embodiment the sheets may be constructed of silicon steel. The sheets may attached to one another using any type of joining process available such as, for example, welding or crimping.

Figure 5:
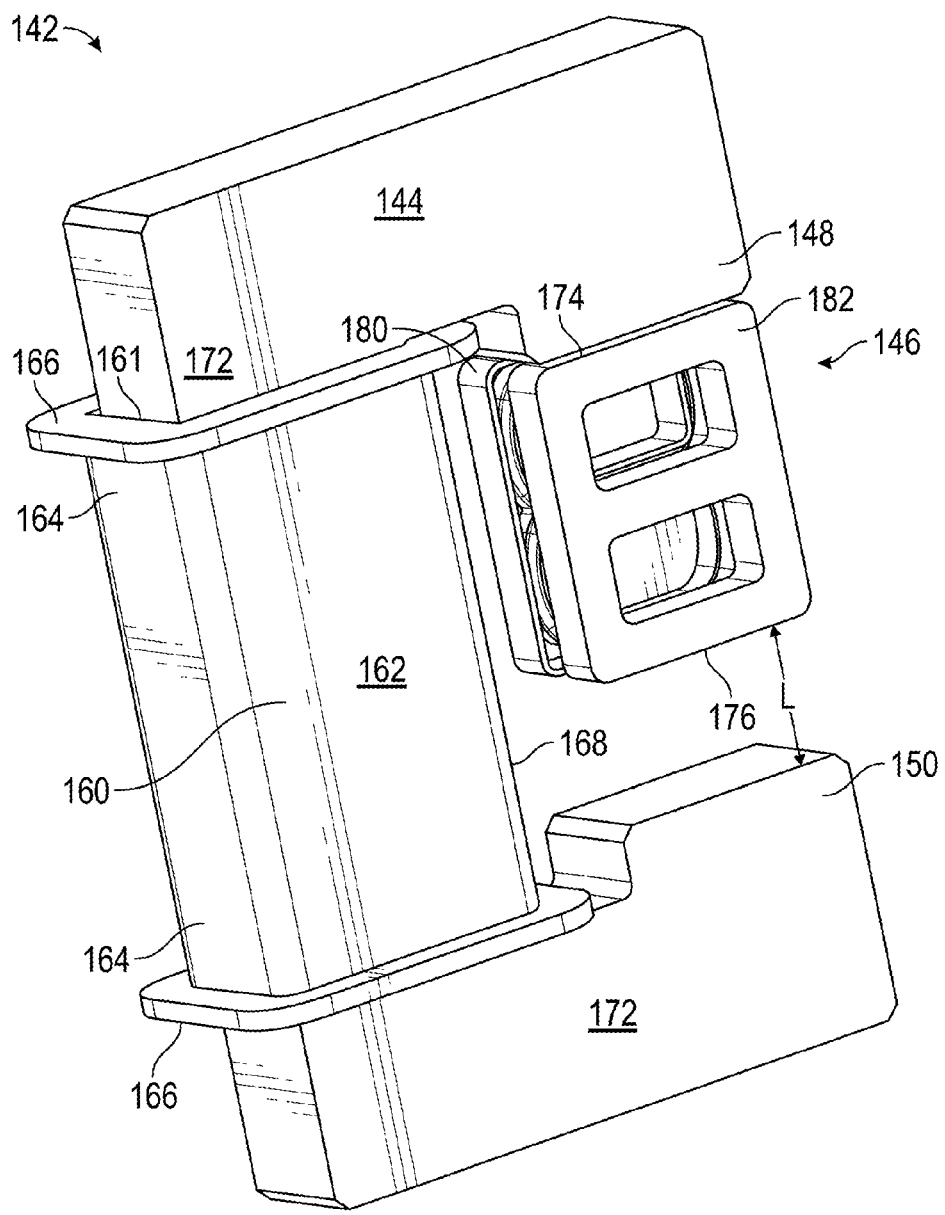
FIG. 5 is a front perspective view of the magnetic actuator assembly shown in FIG. 4 including a bobbin.

Referring to both FIGS. 4 and 5, a bobbin 160 may surround a centrally located portion 163 of the core 144. In one embodiment, the bobbin 160 may be constructed of plastic, and may be manufactured by a plastic injection molding process. Although a plastic injection molding process is described, it is to be understood that other approaches and materials may be used as well to manufacture the bobbin 160. The bobbin 160 includes an aperture 161, a main body 162 and two opposing ends 164. The aperture 161 of the bobbin 160 receives the respective ends 154 of the half sections 152 of the core 144. The main body 162 of the bobbin 160 may include a generally rectangular or square cross-section that is configured to receive the centrally located portion 163 of the core 144. A flange 166 may be located at each end 164 of the bobbin 160.

Figure 6:
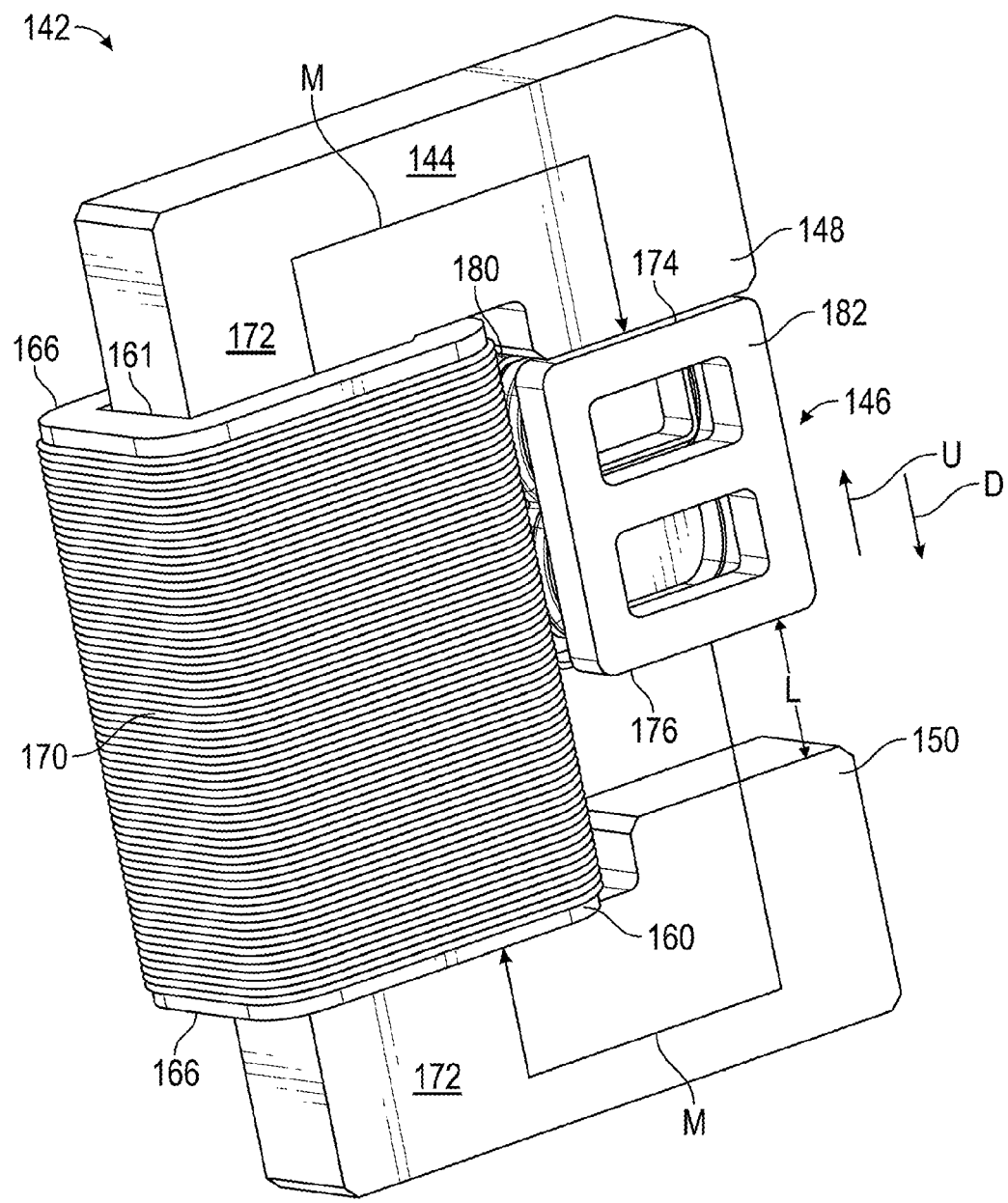
FIG. 6 is a front perspective view of the magnetic actuator assembly and the bobbin shown in FIG. 5, where wiring is wound around the bobbin.

Referring to FIGS. 5-6, wiring 170 may be wound around an outer perimeter 168 of the main body 162 of the bobbin 160. The wiring 170 may be any type of wire configured to carry an electrical current such as, for example, copper wiring. The two flanges 166 may be used to position the wiring 170 in place around the main body 162 of the bobbin 160, and generally prevents the wiring 170 from migrating onto a surface 172 of the core 144. Thus, the bobbin 160 may be used to hold the wiring 170 in place, and generally prevents the wiring 170 from chafing against the surface 172 of the core 144. In one non-limiting embodiment, the bobbin 160 may optionally include a projection (not shown). The projection may be used to receive terminal lugs (not shown) to which the wiring 170 may be attached. The terminal lugs may form part of a connector (not shown) of the magnetic actuator assembly 142.

Figure 9A:
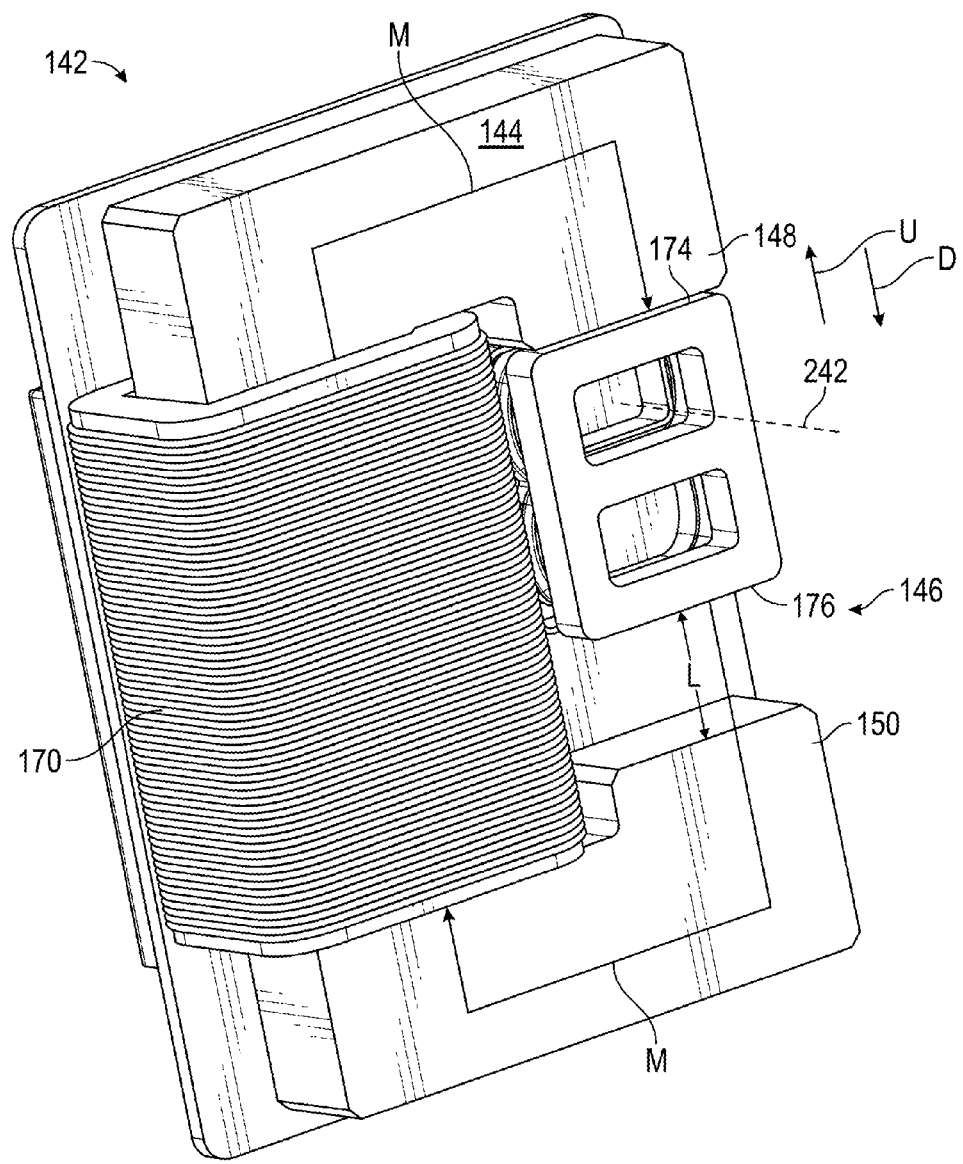
FIGS. 9A-9B are front perspective views of the magnetic actuator assembly shown in FIG. 6, where
Figure 9B:
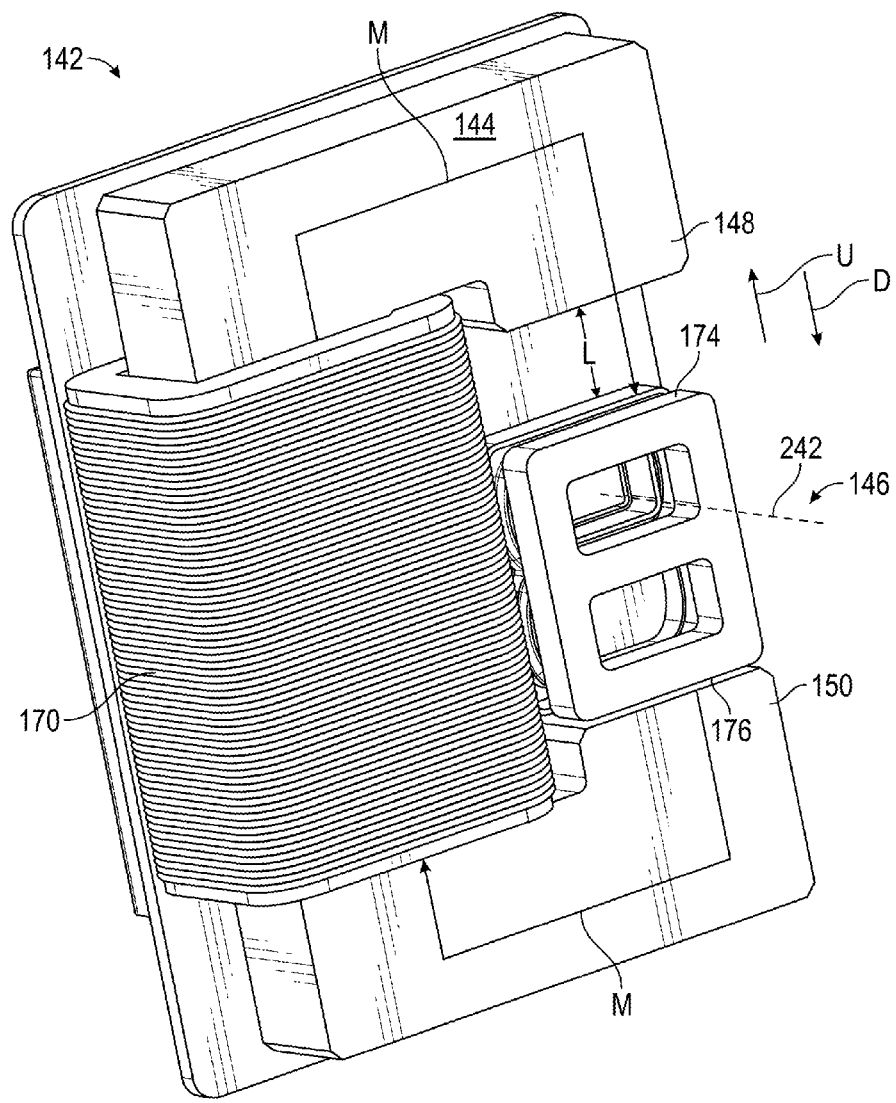
Figure 10A:
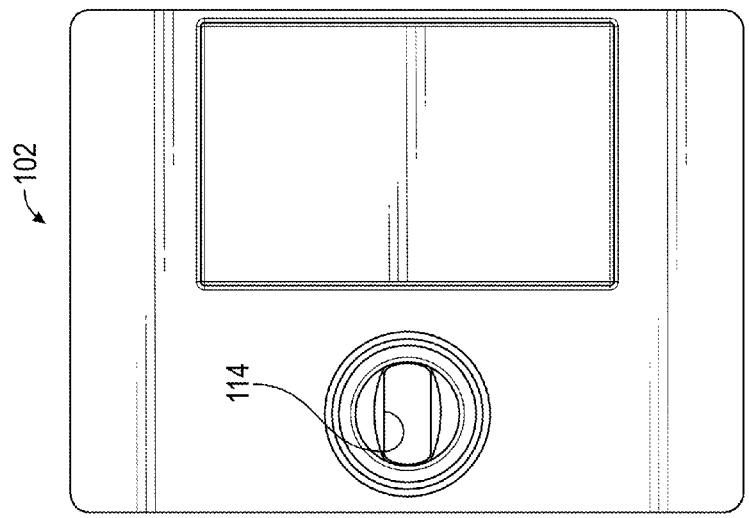
FIGS. 10A-10B are front views of the shut-off valve shown in FIG. 1, where
Figure 10B:
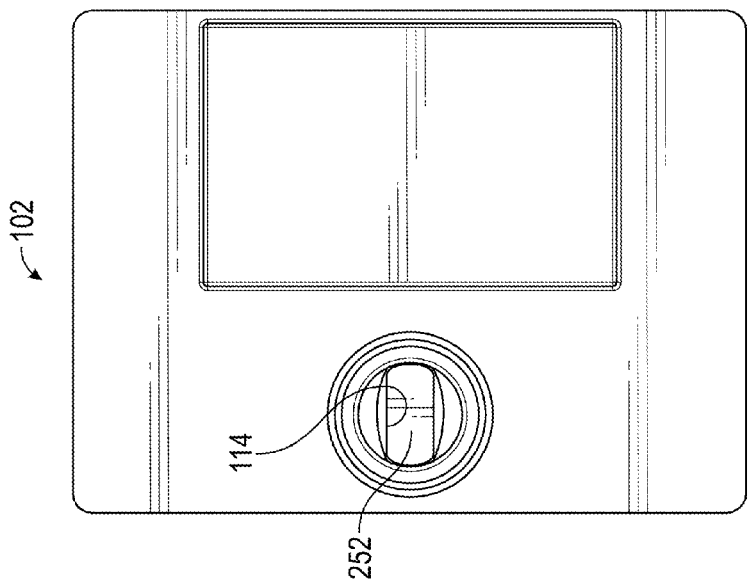

Referring to FIGS. 4-6, the gate assembly 146 may be positioned between the upper end 148 and the lower end 150 of the core 144. The gate assembly 146 includes an upper surface 174 and a lower surface 176. The gate assembly includes a first gate member 180 and a second gate member 182 constructed of a magnetized material. Specifically, the first gate member 180 and the second gate member 182 may be permanently magnetized during manufacture. The gate assembly 146 acts as a shut-off valve mechanism, and may be actuated back and forth between the upper end 148 and the lower end 150 of the core 144. Specifically, the gate assembly may be actuated by a length of travel L. The length of travel L may be measured between the lower surface 176 of the gate assembly 146 and the lower end of the core 144 if the gate assembly 146 is in the closed position (seen in FIGS. 4-6 and 9A). Alternatively, if the gate assembly 146 is in the open position as seen in FIG. 9B, the length of travel L may be measured between the upper surface 174 of the gate assembly 146 and the upper end 148 of the core 144.

Continuing to refer to FIGS. 4-6, the gate assembly 146 may be normally seated in a starting position. The starting position may be either the closed position (shown in FIG. 9A) or the open position (shown in FIG. 9B). The gate assembly 146 remains seated in the starting position until a threshold force is applied to the gate assembly 146. The threshold force is created by a magnetic field M (shown in FIG. 6) induced within the core 144. The threshold force is of a magnitude sufficient to unseat the gate assembly 146 from the starting position, and causes the gate assembly 146 to move into a second position. The second position is opposite from the normally seated position. For example, if the normally seated position is the open position (shown in FIG. 9B), then the second position would be the closed position (shown in FIG. 9A).

Referring to FIG. 6, when electrical current is applied to the wiring 170, the magnetic field M is induced within the core 144. The magnetic field M is also induced between the upper end 148 and the lower end 150 of the core 144. The magnitude or strength of the magnetic field M may be based on the amount of electrical current provided to the wiring 170. Specifically, a predetermined amount of electrical current may be applied to the wiring 170, which in turn creates the magnetic field M that is strong enough to create the threshold force used to move the gate assembly 146 into the second position. In one non-limiting embodiment, the predetermined amount of electric current may be about 1 Amp, with a peak value ranging between about 3 to about 5 Amps.

The direction of the magnetic field M depends on the sign or direction of the electrical current applied to the wiring 170. The magnetic field M may be directed in either a generally upward direction U, or a generally downward direction D with respect to the gate assembly 146. The direction of the magnetic field M may be based on the direction of the electrical current applied to the wiring 170. It should be noted that the direction of the electrical current may be switched in order to switch the direction of the magnetic field M between the upward direction U and the downward direction D.

The gate assembly 146 may remain seated in the starting position due to a residual magnetic field. The gate assembly 146 may remain in the starting position until the predetermined amount of electric current is applied to the wiring 170. Once the predetermined amount of electric current is applied to the wiring 170, the gate assembly 146 is unseated from the starting position and moves the length of travel L and into the second position. Once actuation has occurred, the gate assembly 146 remains seated in the second position, even if power is lost. The direction of the predetermined amount of electric current applied to the wiring 170 may be reversed in order to actuate the gate assembly 146 from the second position back into the normally seated position.

Figure 7:
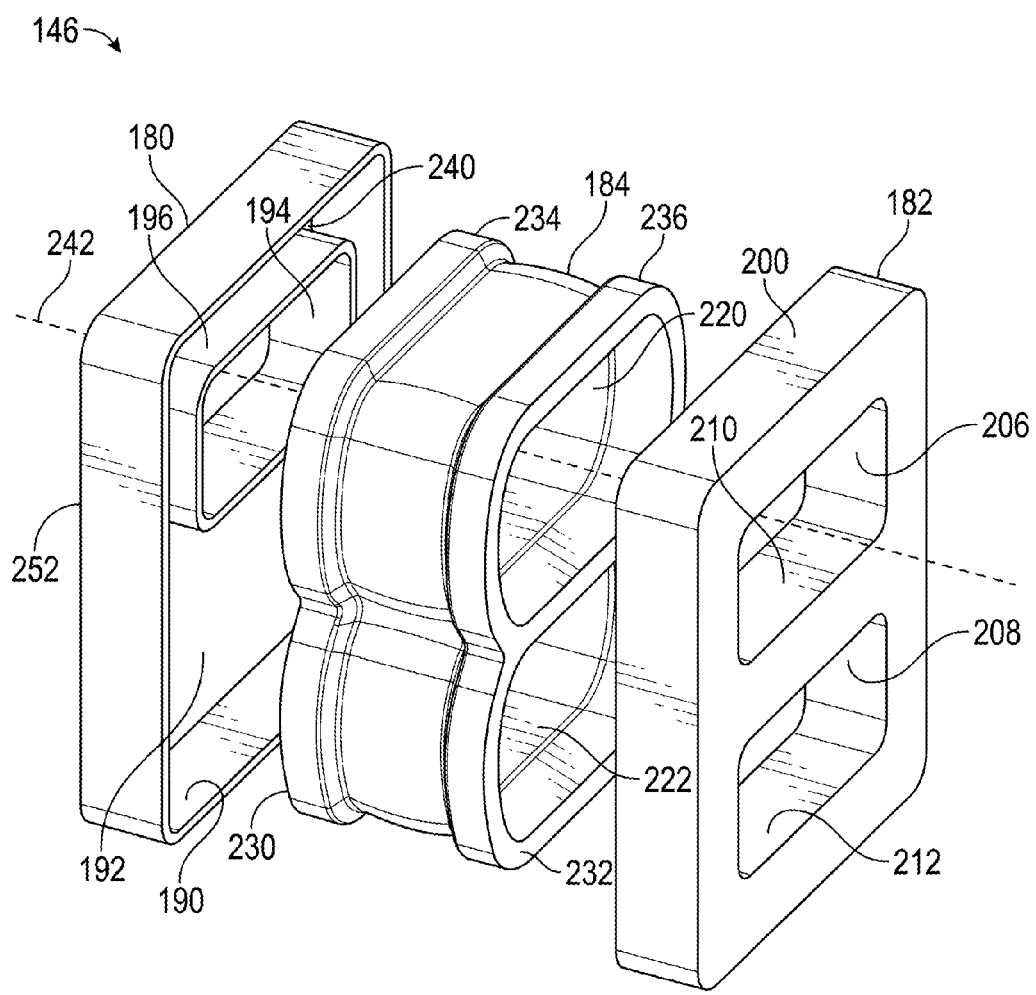
FIG. 7 is an exploded perspective view of a gate assembly.
Figure 8:
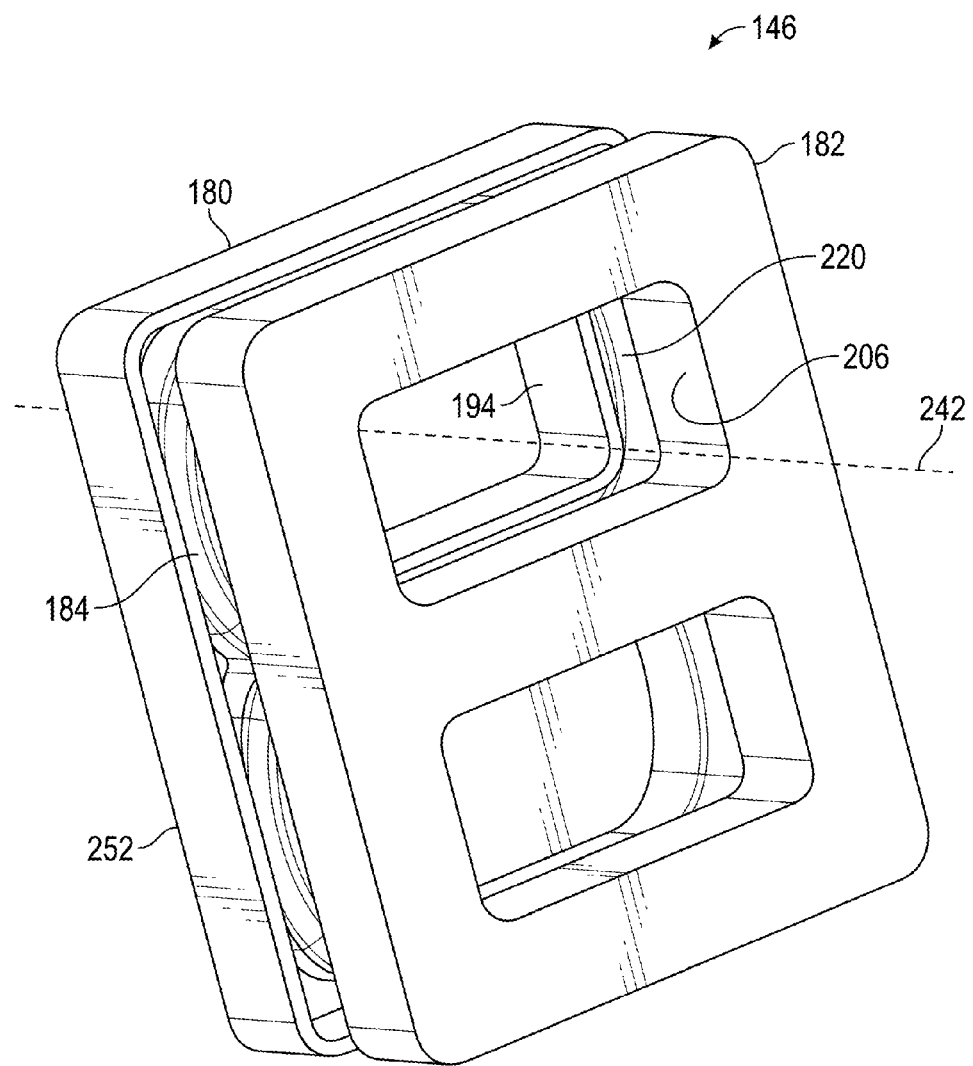
FIG. 8 is an assembled view of the gate assembly shown in FIG. 7.

Referring to FIGS. 7-8, the gate assembly 146 may include the first gate member 180, the second gate member 182, and an elastic member 184 received between the first and second gate members 180, 182. As seen in FIG. 7, an outer lip 190 is located around an outer perimeter of the first gate member 180. The outer lip 190 projects outwardly from a rear surface 192 of the first gate member 180. The first gate member 180 also includes an upper aperture 194, where a lip 196 projects outwardly from the rear surface 192 of the first gate member 180, and surrounds an outer perimeter of the upper aperture 194. An outer lip 200 is also located around an outer perimeter of the second gate member 182. The outer lip 200 projects outwardly from a rear surface (not visible) of the second gate member 182. The second gate member 182 includes an upper aperture 206 and a lower aperture 208. An outer lip 210 may be located around an outer periphery of the upper aperture 206 of the second gate member 182, and projects outwardly from a rear surface (not visible) of the second gate member 182. Similarly, an outer lip 212 may be located around an outer periphery of the lower aperture 208 of the second gate member 182, and projects outwardly from a rear surface (not visible) of the second gate member 182.

As mentioned above, the first gate member 180 and the second gate member 182 are constructed of a magnetized material, and may be permanently magnetized during manufacture. Specifically, in one embodiment, the first gate member 180 and the second gate member 182 may be constructed of a magnetized steel such as, for example, 4140 steel. The first gate member 180 and the second gate member 182 may be heat treated in order to retain a permanent magnetic field. In one embodiment, the first gate member 180 and the second gate member 182 may be stamped or cold headed components. The first gate member 180 and the second gate member 182 may also be coated in order to generally prevent corrosion and wear.

The elastic member 184 may include an upper passageway 220 and a lower passageway 222. In the exemplary embodiment as shown in FIG. 7, the elastic member 184 may be a generally figure-eight shaped section constructed of compliant material. In one embodiment, the elastic member 184 may be constructed of rubber. The elastic member 184 may also include a front end face 230 and a rear end face 232. A front lip or flange 234 may be located around both the upper passageway 220 and the lower passageway 222 of the front end face 230 of the elastic member 184. Similarly, a rear lip or flange 236 may also be located around both the upper passageway 220 and the lower passageway 222 of the rear end face 232 of the elastic member 184. As seen in FIG. 7, the rear flange 236 of the elastic member 184 may include a generally figure-eight shaped section (the front flange 234 also includes a generally figure-eight shaped section, but is not visible in FIG. 7).

Referring to FIGS. 7-8, a portion of the front flange 234 of the elastic member 184 may be received within a channel 240 created between the outer lip 190 and the lip 196 of the first gate member 180. The front flange 234 of the elastic member 184 may seal against the channel 240 of the first gate member 180, and may reduce or prevent fluid leakage into the housing 102 (FIGS. 1-3). Similarly, the rear flange 236 of the elastic member 184 may be received within a channel (not visible) created between the outer lip 200 and the lips 210, 212 of the second gate member 182. The rear flange 236 of the elastic member 184 may seal against the channel (not visible) of the second gate member 182, and may reduce or prevent fluid leakage into the housing 102 (FIGS. 1-3).

The gate assembly 146 may include a passage 242. The passage 242 may be defined by the upper aperture 194 of the first gate member 180, the upper passageway 220 of the elastic member 184, and the upper aperture 206 of the second gate member 182. Referring to FIGS. 1-2, 7-8, 9A-9B, and 10A-10B, when the magnetic actuator assembly 142 is in the closed position as seen in FIG. 9A, a front surface 252 of the first gate member 180 may be aligned with the opening 114 of the first section A of the housing 102 (FIG. 2). Thus, the front surface 252 of the first gate member 180 generally blocks or prevents the fluid flowing from the first conduit portion 106 into the passage 242 of the gate assembly 146. When the magnetic actuator assembly 142 is in the open position as seen in FIG. 9B, the passage 242 of the gate assembly 146 may be generally aligned with the opening 114 of the first section A of the housing 102 (FIG. 2). Thus, fluid flowing from the first conduit portion 106 may enter the passage 242 of the gate assembly 146, and flow to the second conduit portion 108.

Figure 11:
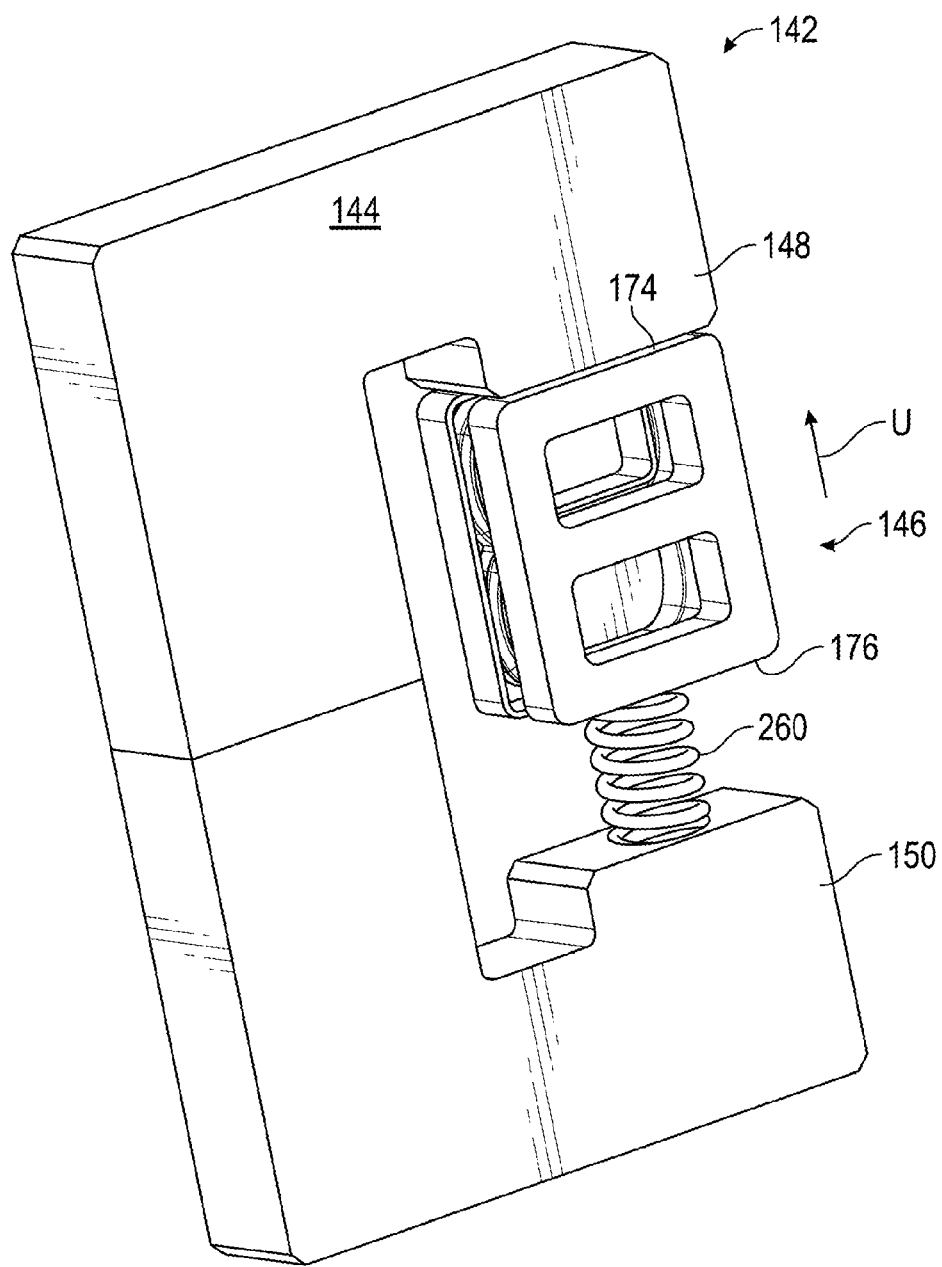
FIG. 11 is a front perspective view of the magnetic actuator assembly shown in FIG. 4 with an optional biasing element.

Referring to FIG. 11, in one embodiment an optional biasing element 260 may be placed between the lower end 150 of the core 144 and a lower surface 176 of the gate assembly 146. In one embodiment, the biasing element 260 may be a spring that exerts a biasing force in the upward direction U. The biasing element 260 may be used to bias the gate assembly 146 in a specific direction. For example, in one embodiment, the biasing element 260 may be used to bias the gate assembly 146 in the closed position.

Figure 12:
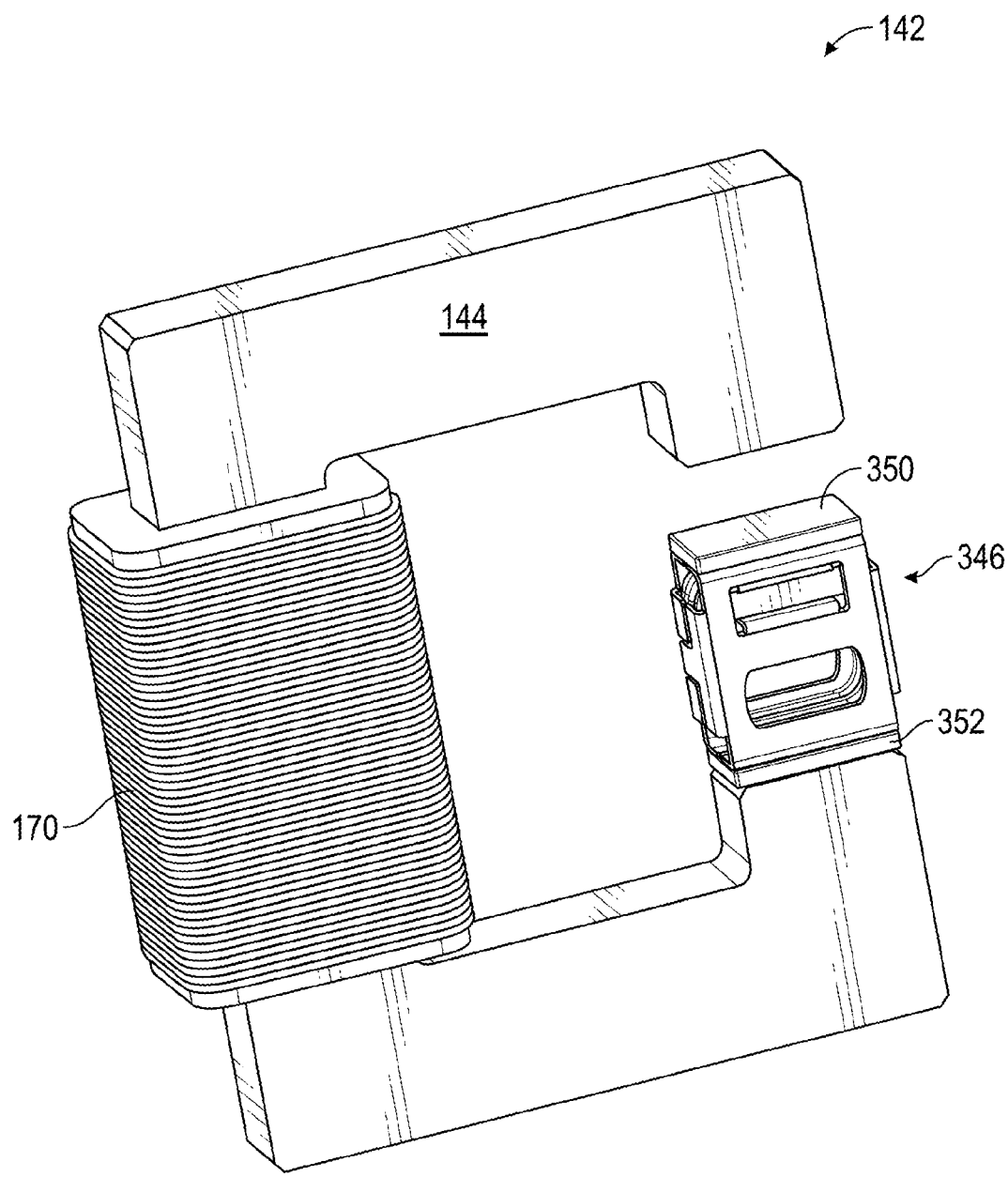
FIG. 12 is a front perspective view of the magnetic actuator assembly shown in FIG. 4 with permanent magnets attached to gate elements.

FIG. 12 is an illustration of the magnetic actuator assembly 142 including an alternative embodiment of a gate assembly 346. The gate assembly 346 may include a first gate member 380 and a second gate member 382 (seen in FIG. 13). Unlike the embodiments as discussed above, the first gate member 380 and the second gate member 382 are constructed of a non-magnetized material such as, for example, steel or plastic. Instead, referring to both FIGS. 12-13, the gate assembly 346 includes a first permanent magnet 350 disposed along an upper surface 374 of the gate assembly 346 and a second permanent magnet 352 disposed along a lower surface 376. The first permanent magnet 350 and the second permanent magnet 352 may be magnetized to a specific field strength by the magnetic field M (FIG. 6) induced by the core 144 of the magnetic actuator assembly 142.

Figure 13:
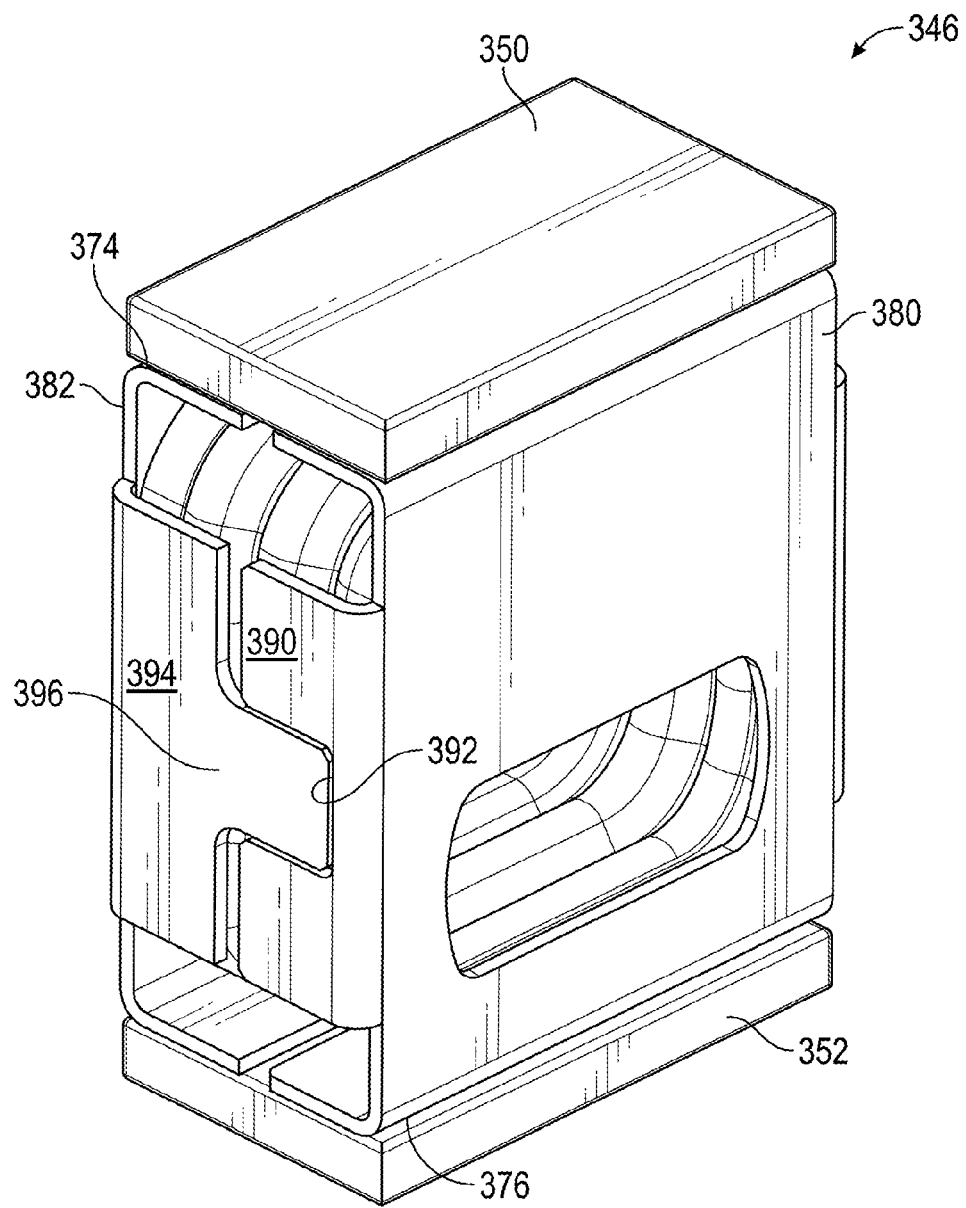
FIG. 13 is an assembled view of the gate assembly shown in FIG. 12.

Referring to FIG. 13, in one embodiment the first gate member 380 and the second gate member 382 may interlock with one another. Specifically, in the exemplary embodiment as shown, a side surface 390 of the first gate member 380 may define a recess 392. The second gate member 382 also includes a side surface 394 that defines a tab 396. The tab 392 of the first gate member 380 may be received by the recess 396 of the second gate member 382. Those skilled in the art will readily appreciate that while FIG. 13 only illustrates one side of the first gate member 380 and the second gate member 382, a similar configuration may be included along the opposing sides as well.

Referring generally to FIGS. 1-7, the device 100 (FIG. 1) may be assembled by first winding the wiring 170 wound around the outer perimeter 168 of the bobbin 160. Once the wiring 170 has been secured to the bobbin 160, the aperture 161 of the bobbin 160 (shown in FIG. 5) receives the respective ends 154 of the half sections 152 of the core 144 (shown in FIG. 4). The half sections 152 of the core 144 both cooperate with one another to create the generally C-shaped core 144. The core 144 and the bobbin 160 may then be placed into a plastic injection molding machine. Plastic may be injected to create the second housing B (shown in FIG. 3). The first housing A (shown in FIG. 2) may be separately molded. Alternatively, the second housing B may be molded separately and the core 144 and the bobbin 260 may be placed within the second housing B. The gate assembly 146 may then be placed within the pocket 136 defined by the second section B of the housing 102 (shown in FIGS. 3 and 4), where the first gate member 180 and the second gate member 182 may be magnetized to the specific field strength based on the magnetic field M induced by the core 144. The first section A and the second section B of the housing 102 may then be joined to one another using a plastic welding process.

The device 100 as described above and illustrated in FIGS. 1-13 is a magnetically actuated shut-off valve that may be simpler in design, smaller in size, have reduced weight, and may be more cost effective when compared to some types of solenoid controlled actuators that are currently available. The device 100 may also suppress the surge phenomenon, without the need of any electrical interface. The device 100 may be used as a shut-off valve to control the amount of engine air flow through an aspirator. Thus, the device 100 only provides engine air flow when required, which reduces the amount of air flow leakage through the aspirator.

Having described the invention in detail and by reference to preferred embodiments thereof, it will be apparent that modifications and variations are possible without departing from the scope of the invention.

What is claimed is:

1. A magnetic actuator assembly, comprising:
   a core constructed of a magnetic material, the core including a first end and a second end;
   wiring wound around a portion of the core, wherein a predetermined amount of electric current is applied to the wiring to induce a magnetic field within the core; and
   a gate assembly positioned between the first end and a second end of the core, the gate assembly comprising:
   a first gate member traveling between the first end and the second end of the core based on a threshold force being applied to the gate assembly, wherein the threshold force is created by the magnetic field; and
   a biasing element located between the second end of the core and a lower surface of the gate assembly, the biasing element biasing the gate assembly towards the first end of the core.

2. The magnetic actuator assembly of claim 1, wherein the threshold force is sufficient to unseat the gate assembly from a starting position, and causes the gate assembly to move into a second position.

3. The magnetic actuator assembly of claim 1, wherein the first gate member is constructed of magnetized material.

4. The magnetic actuator assembly of claim 1, wherein a permanent magnet is attached to both an upper surface and a lower surface of the first gate member.

5. The magnetic actuator assembly of claim 1, wherein the gate assembly comprises a second gate member, wherein both the first gate member and the second gate member travel between the first surface and the second surface together.

6. The magnetic actuator assembly of claim 5, wherein the gate assembly comprises an elastic member received between the first gate member and the second gate member.

7. The magnetic actuator assembly of claim 1, comprising a bobbin surrounding a portion of the core, wherein the wiring is wound around the bobbin.

8. The magnetic actuator assembly of claim 1, wherein the core is constructed of two symmetrical half sections.

9. The magnetic actuator assembly of claim 8, wherein the two symmetrical half sections are constructed of a series of sheets that act as a conduit for magnetic flux to travel.

10. A housing, comprising:
a first section having a first conduit portion;
a second section having a second conduit portion that is in fluid communication with the first conduit portion, wherein the first section and the second section are joined together to define the housing; and
a magnetic actuator assembly located within the housing, comprising:
a core constructed of a magnetic material, the core including a first end and a second end;
a bobbin surrounding a portion of the core;
wiring wound around the bobbin, wherein a predetermined amount of electric current is applied to the wiring to induce a magnetic field within the core; and
a gate assembly positioned between the first end and the second end of the core, the gate assembly defining a passageway that blocks a flow of fluid flowing from the first conduit portion if the gate assembly is in a closed position, the gate assembly comprising:
a first gate member defining a first aperture;
a second gate member defining a second aperture; and
an elastic member received between the first gate member and the second gate member, the elastic member defining an elastic member aperture, wherein the first aperture of the first gate assembly, the second aperture of the second gate assembly, and the elastic member aperture of the elastic member are aligned with one another and define the passageway of the gate assembly, and wherein both the first gate member and the second gate member travel together between the first end and the second end of the core based on a threshold force being applied to the gate assembly, wherein the threshold force is created by the magnetic field.

11. The housing of claim 10, wherein the threshold force is sufficient to unseat the gate assembly from the closed position, and causes the gate assembly to move into an open position.

12. The housing of claim 10, wherein the first gate member and the second gate member are both constructed of magnetized material.

13. The housing of claim 10, wherein a permanent magnets are attached to an upper surface and a lower surface of both the first gate member and the second gate member.

14. The housing of claim 10, wherein the core is constructed of two symmetrical half sections.

15. The housing of claim 14, wherein the two symmetrical half sections are constructed of a series of sheets that act as a conduit for magnetic flux to travel.

16. The housing of claim 10, wherein the first section and the second section of the housing are plastic injection molded components.

17. The housing of claim 10, wherein the first section and the second section of the housing are joined together by a plastic weld.

18. The housing of claim 10, wherein the magnetic actuator assembly comprises a biasing element to bias the gate assembly in the closed position.

* * * * *